(12) United States Patent
Orlov

(10) Patent No.: US 12,704,629 B2
(45) Date of Patent: Aug. 11, 2026

(54) LIDAR SYSTEMS AND METHODS

(71) Applicant: YANDEX SELF DRIVING GROUP LLC, Moscow (RU)

(72) Inventor: Nikolay Evgenevich Orlov, Sarapul (RU)

( * ) Notice: Subject to any disclaimer, the term of this patent is extended or adjusted under 35 U.S.C. 154(b) by 920 days.

(21) Appl. No.: 18/074,337

(22) Filed: Dec. 2, 2022

(65) Prior Publication Data

US 2023/0176213 A1 Jun. 8, 2023

(30) Foreign Application Priority Data

Dec. 2, 2021 (RU) .......................... RU2021135482

(51) Int. Cl.
*G01S 17/10* (2020.01)
*G01S 7/481* (2006.01)
*G01S 7/4865* (2020.01)
*G01S 17/89* (2020.01)

(52) U.S. Cl.
CPC ............ *G01S 17/10* (2013.01); *G01S 7/4817* (2013.01); *G01S 7/4865* (2013.01); *G01S 17/89* (2013.01)

(58) Field of Classification Search
CPC ................................ G01S 17/10; G01S 17/89
See application file for complete search history.

(56) References Cited

U.S. PATENT DOCUMENTS 5,760,886 A * 6/1998 Miyazaki ............ G01B 11/026 180/169
6,246,468 B1 * 6/2001 Dimsdale ............ G01B 11/002 356/4.02
10,073,166 B2 9/2018 Dussan
2011/0194098 A1 8/2011 Goto
2019/0107623 A1 4/2019 Campbell et al.
2019/0248439 A1 8/2019 Wang
2019/0383911 A1 * 12/2019 Zhang .................. G02B 26/101
2020/0072948 A1 * 3/2020 Nguyen ................ G01S 17/931
2020/0158829 A1 * 5/2020 Han ........................ G01S 7/484
2021/0325663 A1 10/2021 Hughes

FOREIGN PATENT DOCUMENTS

EP 1348981 A2 10/2003
RU 2738588 C1 12/2020

OTHER PUBLICATIONS

European Search Report dated May 2, 2023 issued in respect of the counterpart European Patent Application No. 22210395.4.
Russian Search Report dated Dec. 15, 2023 issued in respect of the counterpart Russian Patent Application No. RU 2021135482.

* cited by examiner

*Primary Examiner* — Marisa V Conlon
(74) *Attorney, Agent, or Firm* — BCF LLP

(57) ABSTRACT

A method for managing scanning by a LIDAR system, the method being performed by a controller. The method includes controlling a scanning mirror to scan a plurality of light beams outward from the LIDAR system, the plurality of light beams being created by a light source of the system, causing the scanning mirror to rotate at a first rate in a first rotational direction, and causing the scanning mirror to rotate at a second rate in a second rotational direction, the second rate being greater than the first rate; sensing, by a sensor array of the LIDAR, incident light on the scanning mirror reflected to the sensor array; determining a distance-information point cloud while the scanning mirror is in the first direction; and determining an image of a scanned area surrounding the LIDAR system while the scanning mirror is rotating in the second direction.

16 Claims, 6 Drawing Sheets

LIDAR SYSTEMS AND METHODS

CROSS-REFERENCE

The present application claims priority to Russian Patent Application No. 2021135482, entitled "Lidar Systems and Methods", filed Dec. 2, 2021, the entirety of which is incorporated herein by reference.

TECHNICAL FIELD

The present technology relates generally to Light Detection and Ranging (LIDAR) systems and methods for detecting objects in a surrounding environment of an autonomous vehicle; and in particular, to imaging in LIDAR systems.

BACKGROUND

In devices using LIDAR systems, for example autonomously driving vehicles, the dual concerns of accuracy and density of information often drive LIDAR system adaption. Broadly, light is scanned across the surrounding area and light beams reflected from surrounding objects are collected by the LIDAR system.

In some instances, it can be advantageous to simultaneously acquire images of the surroundings of a particular LIDAR system. This normally requires additional imaging channels in or near the LIDAR housing, for instance including additional cameras or two-dimensional sensors. The inclusion of additional equipment in order to perform imaging, however, can be disadvantageous, for instance increasing the fabrication costs and/or weight of the LIDAR system.

There remains therefore a desire for improved LIDAR systems.

SUMMARY

Therefore, there is a need for systems and methods which avoid, reduce or overcome the limitations of the prior art.

In accordance with a first broad aspect of the present technology, there is provided a LIDAR system operable in both distance point-cloud LIDAR measurement mode and an imaging mode. When the scanning mirror of the LIDAR system is moving in a first scanning direction, a time-of-flight distance point-cloud is determined. While the scanning mirror is moving in a second scanning direction, in order to return the scanning mirror to a starting position for scanning, the system of the present technology further acquires images of the surroundings. Both the time-of-flight LIDAR measurements and the images are acquired by a same sensor array. By acquiring images of the surroundings while the scanning mirror is resetting, and no LIDAR measurements are being taken, additional information about the surroundings can be acquired without interrupting standard LIDAR operation. As the images are acquired with the same sensor array as the point-cloud measurements, no additional separate cameras or sensors are required.

In accordance with a first broad aspect of the present technology, there is provided a method for managing scanning by a LIDAR system, the method being performed by a controller of the LIDAR system. The method includes controlling a scanning mirror of the LIDAR system to scan a plurality of light beams outward from the LIDAR system, the plurality of light beams being created by a light source of the LIDAR system, controlling the scanning mirror to scan including causing the scanning mirror to rotate at a first rate in a first rotational direction, and causing the scanning mirror to rotate at a second rate in a second rotational direction, the second rate being greater than the first rate, the second rotational direction being opposite the first rotational direction; sensing, by a sensor array of the LIDAR, incident light on the scanning mirror reflected to the sensor array; determining a distance-information point cloud based on light collected by the sensor array while the scanning mirror is rotating at the first rate in the first rotation direction; and determining an image of a scanned area surrounding the LIDAR system based on light collected by the sensor array while the scanning mirror is rotating at the second rate in the second rotation direction.

In some embodiments, determining the distance-information point cloud based on light collected by the sensor array includes determining the distance-information point cloud based on light collected by a selected sensor of the sensor array.

In some embodiments, causing the scanning mirror to rotate at the second rate includes causing the scanning mirror to rotate at a rate at least twice the first rate.

In some embodiments, causing the scanning mirror to rotate at the second rate includes causing the scanning mirror to rotate at a rate at approximately ten times the first rate.

In some embodiments, determining the image of the scanned area includes retrieving light information from each of a plurality of detectors forming the sensor array; and constructing the image based on an image reconstruction method based on at least the light information retrieved.

In some embodiments, controlling the scanning mirror to scan includes causing the scanning mirror to rotate at the first rate for at least 90% of operation time, and causing the scanning mirror to rotate at the second rate for no more than 10% of operation time.

In some embodiments, the scanning mirror rotates about a first axis; and further includes controlling a scanning element to rotate about a second axis, the second axis being perpendicular to the first axis.

In some embodiments, controlling the scanning element includes controlling the scanning element to rotate about a rotation rate of approximately ten times faster than the first rate of the scanning mirror.

In some embodiments, the method further includes controlling the light source to create the plurality of light beams only while the scanning mirror is caused to rotate at the first rate in the first rotation direction.

In accordance with another broad aspect of the present technology, there is provided a LIDAR system, including a controller; a light source operatively connected to the controller; a sensor array operatively connected to the controller, the sensor array including a plurality of detectors; and a scanning system operatively connected to the controller. The scanning system includes a scanning mirror configured to oscillate about a first axis, and a scanning element configured to rotate about a second axis, the second axis being perpendicular to the first axis, the scanning mirror being configured to rotate about the first axis at a first rate in a first rotational direction, and to rotate about the first axis at a second rate in a second rotational direction, the sensor array and the controller being configured to determine a distance-information point cloud based on light collected by the sensor array while the scanning mirror is rotating at the first rate in the first rotation direction, and to determine an image of a scanned area based on light collected by the sensor array while the scanning mirror is rotating at the second rate in the second rotation direction.

In some embodiments, the second rate of rotation of the scanning mirror is greater than the first rate of rotation of the scanning mirror.

In some embodiments, the second rate of rotation is approximately ten times faster than the first rate of rotation.

In some embodiments, the system is arranged and configured to determine the distance-information point cloud based on time of flight (ToF) determined using at least one of the plurality of detectors.

In some embodiments, the plurality of detectors comprises at least sixteen detectors arranged in a plane.

In some embodiments, the scanning element is a rotating prism spinning about the second axis.

In some embodiments, the rotating prism is configured to rotate about the second axis at a rate of approximately ten times faster than the first rate of the scanning mirror.

In some embodiments, the scanning mirror is configured to rotate at the first rate for at least 90% of operation time of the system; and to rotate at the second rate for no more than 10% of operation time of the system.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light sources referenced could include one or more lasers such as a solid-state laser, laser diode, a high-power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser sources may emit light beams in differing formats, such as light pulses, continuous wave (CW), quasi-CW, and so on. In some non-limiting examples, the laser sources may include a laser diode configured to emit light at a wavelength between about 650 nm and 1150 nm. Alternatively, the light sources may include a laser diode configured to emit light beams at a wavelength between about 800 nm and about 1000 nm, between about 850 nm and about 950 nm, between about 1300 nm and about 1600 nm, or in between any other suitable range. For example, depending on the particular components, the light sources could vary from 400 nm to 2000 nm. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest (ROI). The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected or scattered from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein. As certain non-limiting examples, objects detected may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

In the context of the present specification, a "Region of Interest" (ROI) may broadly include a portion of the observable environment of a LIDAR system in which the one or more objects may be detected. It is noted that the region of interest of the LIDAR system may be affected by various conditions such as but not limited to: an orientation of the LIDAR system (e.g. direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The ROI of the LIDAR the system may be defined, for example, by a plane angle or a solid angle. In one example, the ROI may also be defined within a certain distance range (e.g. up to 200 m or so).

In the context of the present specification, "controller" or "electronic device" is any computer hardware that is capable of running software appropriate to the relevant task at hand and/or controlling or managing functionalities of connected components. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

The functions of the various elements described or shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

Unless otherwise noted, the Figures are not necessarily drawn to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

With these fundamentals in place, we will now consider some non-limiting examples to illustrate various implementations of aspects of the present technology.

Figure 1:
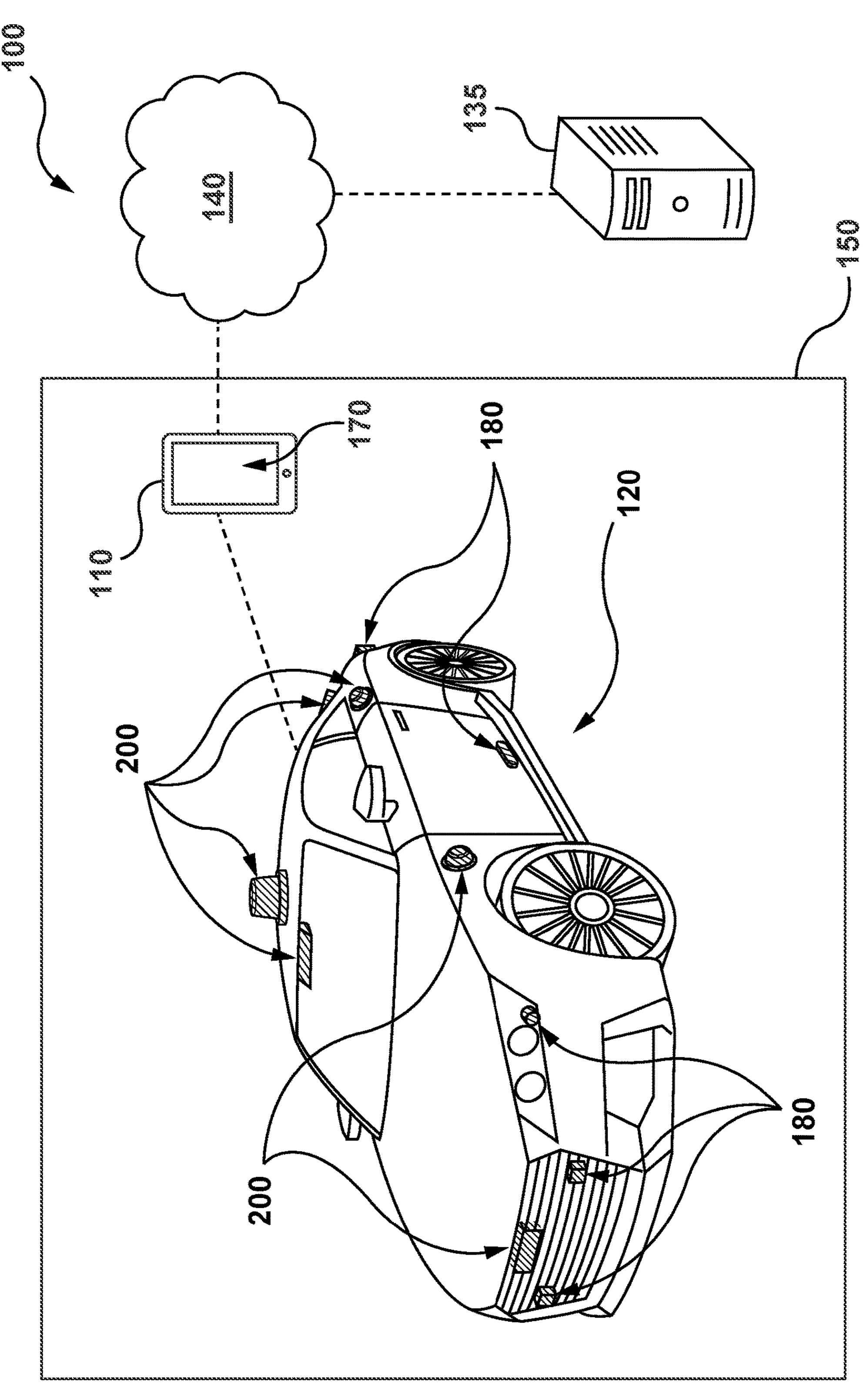
FIG. 1 depicts a schematic diagram of a networked computing environment being suitable for use with certain non-limiting embodiments of the present technology.

With reference to FIG. 1, there is depicted a networked computing environment 100 suitable for use with some non-limiting embodiments of the present technology. The networked computing environment 100 includes an electronic device 110 associated with a vehicle 120 and/or associated with a user (not depicted) who is associated with the vehicle 120 (such as an operator of the vehicle 120). The networked computing environment 100 also includes a server 135 in communication with the electronic device 110 via a communication network 140 (e.g. the Internet or the like, as will be described in greater detail herein below).

Figure 2:
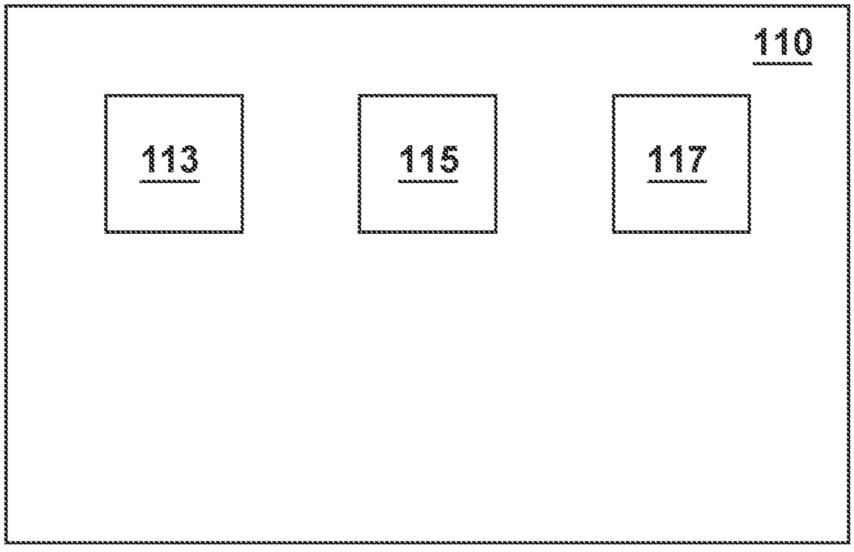
FIG. 2 depicts a schematic diagram of an electronic device configurable for implementing certain non-limiting embodiments of the present technology.

Referring to FIG. 2, there is depicted a schematic diagram of an embodiment of the electronic device 110 suitable for use with some implementations of the present technology. The computer system 100 includes various hardware components including one or more single or multi-core processors collectively represented by a processor 113, a solid-state drive 115, and a memory 117, which may be a random-access memory or any other type of memory.

Communication between the various components of the device 110 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 115 stores program instructions suitable for being loaded into the memory 117 and executed by the processor 113 for determining a presence of an object. For example, the program instructions may be part of a vehicle control application executable by the processor 113. It is noted that the device 110 may have additional and/or optional components (not depicted), such as network communication modules, localization modules, and the like.

According to the present technology, the implementation of the electronic device 110 is not particularly limited. For example, the electronic device 110 could be implemented as a vehicle engine control unit, a vehicle CPU, a vehicle navigation device (e.g. TomTom™ Garmin™), a tablet, a personal computer built into the vehicle 120, and the like. Thus, it should be noted that the electronic device 110 may or may not be permanently associated with the vehicle 120. Additionally or alternatively, the electronic device 110 could be implemented in a wireless communication device such as a mobile telephone (e.g. a smart-phone or a radio-phone). In certain embodiments, the electronic device 110 has a display 170.

In the present embodiment, the electronic device 110 includes the components of the computer system 100 depicted in FIG. 2, but some components could be omitted or modified depending on the particular embodiment. In certain embodiments, the electronic device 110 is an on-board computer device and includes the processor 113, the solid-state drive 115 and the memory 117. In other words, the electronic device 110 includes hardware and/or software and/or firmware, or a combination thereof, for processing data as will be described in greater detail below.

Returning to FIG. 1, in some non-limiting embodiments of the present technology, the networked computing environment 100 could include a GPS satellite (not depicted) transmitting and/or receiving a GPS signal to/from the electronic device 110. It will be understood that the present technology is not limited to GPS and may employ a positioning technology other than GPS. It should be noted that the GPS satellite can be omitted altogether.

The vehicle 120, to which the electronic device 110 is associated, could be any transportation vehicle, for leisure or otherwise, such as a private or commercial car, truck, motorbike or the like. Although the vehicle 120 is depicted as being a land vehicle, this may not be the case in each and every non-limiting embodiment of the present technology. For example, in certain non-limiting embodiments of the present technology, the vehicle 120 may be a watercraft, such as a boat, or an aircraft, such as a flying drone.

The vehicle 120 may be user operated or a driver-less vehicle. In some non-limiting embodiments of the present technology, it is contemplated that the vehicle 120 could be implemented as a Self-Driving Car (SDC). It should be noted that specific parameters of the vehicle 120 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

In some non-limiting embodiments of the present technology, the communication network 140 is the Internet. In alternative non-limiting embodiments of the present technology, the communication network 140 can be implemented as any suitable local area network (LAN), wide area network (WAN), a private communication network or the like. It should be expressly understood that implementations for the communication network 140 are for illustration purposes only. A communication link (not separately numbered) is provided between the electronic device 110 and the communication network 140, the implementation of which will depend, inter alia, on how the electronic device 110 is implemented. Merely as an example and not as a limitation, in those non-limiting embodiments of the present technology where the electronic device 110 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 140 may also use a wireless connection with the server 135.

In some embodiments of the present technology, the server 135 is implemented as a computer server and could include some or all of the components of the device 110 of FIG. 2, such as processors, solid-state drives, and/or memory devices. In one non-limiting example, the server 135 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the server 135 is a single server. In alternative non-limiting embodiments of the present technology, the functionality of the server 135 may be distributed and may be implemented via multiple servers (not shown).

In some non-limiting embodiments of the present technology, the processor 113 of the electronic device 110 could be in communication with the server 135 to receive one or more updates. Such updates could include, but are not limited to, software updates, map updates, routes updates, weather updates, and the like. In some non-limiting embodiments of the present technology, the processor 113 can also be configured to transmit to the server 135 certain operational data, such as routes travelled, traffic data, performance data, and the like. Some or all such data transmitted between the vehicle 120 and the server 135 may be encrypted and/or anonymized.

It should be noted that a variety of sensors and systems may be used by the electronic device 110 for gathering information about surroundings 150 of the vehicle 120. As seen in FIG. 1, the vehicle 120 may be equipped with a plurality of sensor systems 180. It should be noted that different sensor systems from the plurality of sensor systems 180 may be used for gathering different types of data regarding the surroundings 150 of the vehicle 120.

In one example, the plurality of sensor systems 180 may include various optical systems including, inter alia, one or more camera-type sensor systems that are mounted to the vehicle 120 and communicatively coupled to the processor 113 of the electronic device 110. Broadly speaking, the one or more camera-type sensor systems may be configured to gather image data about various portions of the surroundings 150 of the vehicle 120. In some cases, the image data provided by the one or more camera-type sensor systems could be used by the electronic device 110 for performing object detection procedures. For example, the electronic device 110 could be configured to feed the image data provided by the one or more camera-type sensor systems to an Object Detection Neural Network (ODNN) that has been trained to localize and classify potential objects in the surroundings 150 of the vehicle 120.

In another example, the plurality of sensor systems 180 could include one or more radar-type sensor systems that are mounted to the vehicle 120 and communicatively coupled to the processor 113. Broadly speaking, the one or more radar-type sensor systems may be configured to make use of radio waves to gather data about various portions of the surroundings 150 of the vehicle 120. For example, the one or more radar-type sensor systems may be configured to gather radar data about potential objects in the surroundings 150 of the vehicle 120, such data potentially being representative of a distance of objects from the radar-type sensor system, orientation of objects, velocity and/or speed of objects, and the like.

It should be noted that the plurality of sensor systems 180 could include additional types of sensor systems to those non-exhaustively described above and without departing from the scope of the present technology.

According to the present technology and as is illustrated in FIG. 1, the vehicle 120 is equipped with at least one Light Detection and Ranging (LIDAR) system, such as a LIDAR system 200, for gathering information about surroundings 150 of the vehicle 120. While described herein in the context of being attached to the vehicle 120, it is also contemplated that the LIDAR system 200 could be a stand-alone operation or connected to another system.

Depending on the embodiment, the vehicle 120 could include more or fewer LIDAR systems 300 than illustrated. Depending on the particular embodiment, choice of inclusion of particular ones of the plurality of sensor systems 180 could depend on the particular embodiment of the LIDAR system 200. The LIDAR system 200 could be mounted, or retrofitted, to the vehicle 120 in a variety of locations and/or in a variety of configurations.

For example, depending on the implementation of the vehicle 120 and the LIDAR system 200, the LIDAR system 200 could be mounted on an interior, upper portion of a windshield of the vehicle 120. Nevertheless, as illustrated in FIG. 1, other locations for mounting the LIDAR system 200 are within the scope of the present disclosure, including on a back window, side windows, front hood, rooftop, front grill, front bumper or the side of the vehicle 120. In some cases, the LIDAR system 200 can even be mounted in a dedicated enclosure mounted on the top of the vehicle 120. In some non-limiting embodiments, such as that of FIG. 1, a given one of the plurality of LIDAR systems 200 is mounted to the rooftop of the vehicle 120 in a rotatable configuration. For example, the LIDAR system 100 mounted to the vehicle 120 in a rotatable configuration could include at least some components that are rotatable 360 degrees about an axis of rotation of the given LIDAR system 200. When mounted in rotatable configurations, the given LIDAR system 200 could gather data about most of the portions of the surroundings 150 of the vehicle 120.

In some non-limiting embodiments of the present technology, also illustrated in FIG. 1, the LIDAR systems 200 could be mounted to the side, or the front grill, for example, in a non-rotatable configuration. For example, the LIDAR system 200 mounted to the vehicle 120 in a non-rotatable configuration could include at least some components that are not rotatable 360 degrees and are configured to gather data about pre-determined portions of the surroundings 150 of the vehicle 120.

Irrespective of the specific location and/or the specific configuration of the LIDAR system 200, it is configured to capture data about the surroundings 150 of the vehicle 120 used, for example, for building a multi-dimensional map of objects in the surroundings 150 of the vehicle 120. In embodiments where the LIDAR system 200 is installed in a location other than in the vehicle 120, the LIDAR systems 200 could be configured to capture the data about some pre-determined surroundings of the location of the LIDAR system 200.

It should be noted that although in the description provided herein the LIDAR system 200 is implemented as a Time of Flight LIDAR system—and as such, includes respective components suitable for such implementation thereof—other implementations of the LIDAR system 200 are also possible without departing from the scope of the present technology.

Figure 3:
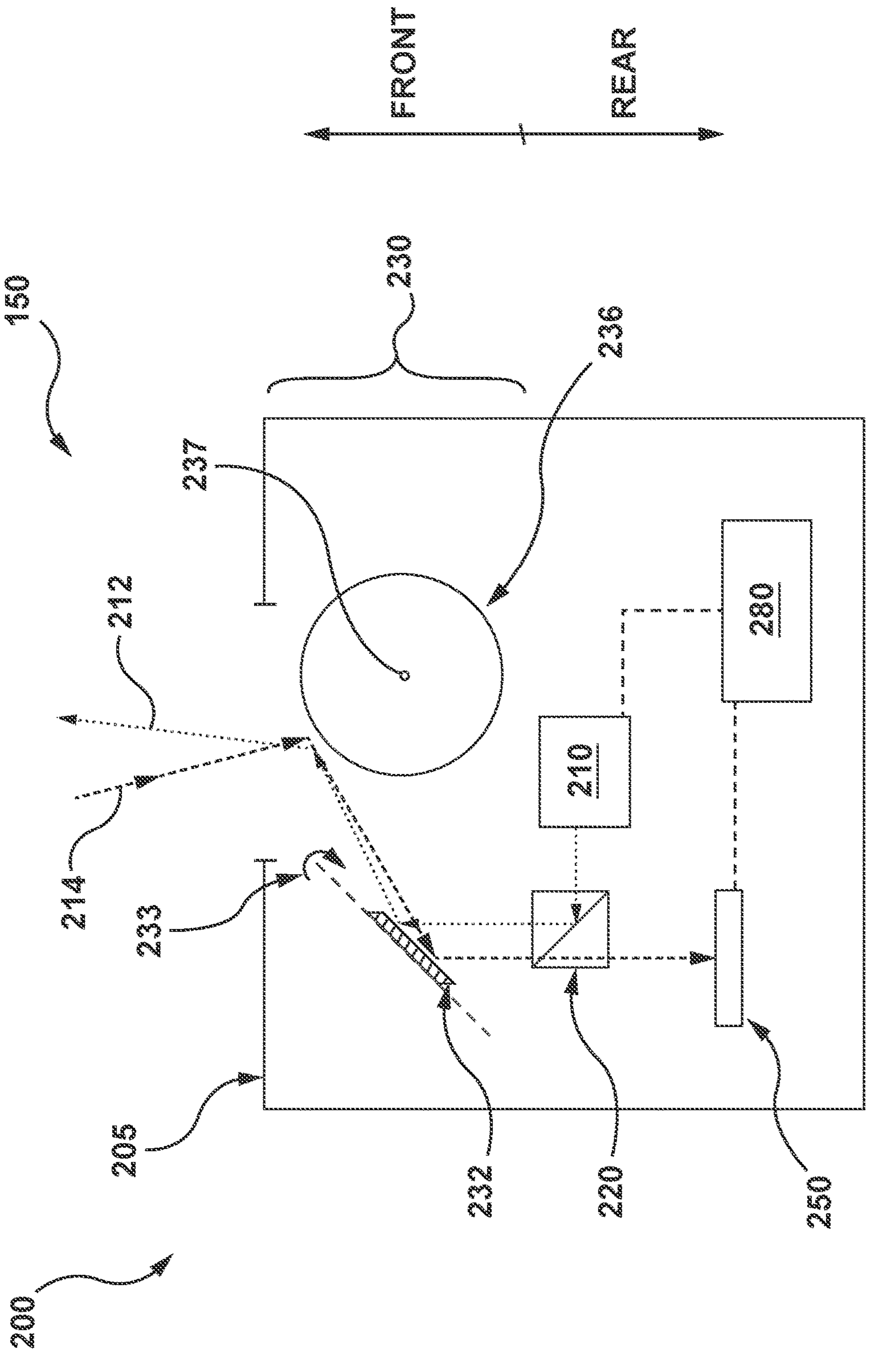
FIG. 3 schematically depicts a LIDAR system according to non-limiting embodiments of the present technology.

With reference to FIG. 3, there is depicted a schematic diagram of one particular embodiment of the LIDAR system 200 implemented in accordance with certain non-limiting embodiments of the present technology.

Broadly speaking, the LIDAR system 200 includes a variety of internal components including, but not limited to: (i) a light source 210 (also referred to as a "laser source" or a "radiation source"), (ii) a beam splitting element 220, (iii) a scanner system 230 (also referred to as a "scanner assembly"), (iv) a sensor array 250 (also referred to herein as a "detection system", "receiving assembly", or a "detector array"), and (v) a controller 280. It is contemplated that in addition to the components non-exhaustively listed above, the LIDAR system 200 could include a variety of sensors (such as, for example, a temperature sensor, a moisture sensor, etc.) which are omitted from FIG. 3 for sake of clarity.

In certain non-limiting embodiments of the present technology, one or more of the internal components of the LIDAR system 200 are disposed in a common housing 205 as depicted in FIG. 3. In some embodiments of the present technology, the controller 280 could be located outside of the common housing 205 and communicatively connected to the components therein. For instance, the controller 280 could be implemented, in at least some embodiments, by the electronic device 110.

Broadly speaking, the LIDAR system 200 operates as follows: the light source 210 of the LIDAR system 200 emits pulses of light, forming an output beam 212; the scanning system 230 scans the output beam 212 across the surroundings 150 of the vehicle 120 for locating/capturing data of a priori unknown objects therein, for example, for generating a multi-dimensional map of the surroundings 150 where objects are represented in a form of one or more data points. The light source 210 and the scanning system 230 will be described in more detail below.

Once the output beam 212 reaches one or more objects in the surroundings, the object(s) generally reflects at least a portion of light from the output beam 212, and some of the reflected light beams may return back towards the LIDAR system 200, to be received in the form of an input beam 214. It is noted that a portion of the light of the output beam 212 may be absorbed or scattered by objects in the surroundings.

The input beam 214, when arriving at the LIDAR system 200, is received by the scanning system 230 and directed thereby to the sensor array 250. The input beam 214 is then captured and detected by the sensor array 250. In response, the sensor array 250 is then configured to generate one or more representative data signals. For example, the sensor array 250 may generate an output electrical signal (not depicted) that is representative of the input beam 214. The sensor array 250 may also provide the so-generated electrical signal to the controller 280 for further processing. Finally, by measuring a time between emitting the output beam 212 and receiving the input beam 214, the distance(s) to the objects in the surroundings 150 are calculated by the controller 280 (described further below).

Use and implementations of these components of the LIDAR system 200, in accordance with certain non-limiting embodiments of the present technology, will be described immediately below.

The light source 210 is communicatively coupled to the controller 280 and is configured to emit light having a given operating wavelength. To that end, in certain non-limiting embodiments of the present technology, the light source 210 could include at least one laser pre-configured for operation at the given operating wavelength. The given operating wavelength of the light source 210 may be in the infrared, visible, and/or ultraviolet portions of the electromagnetic spectrum. The operating wavelength could generally be limited by factors including, but not limited to, specifications of narrow bandpass filters disposed in the system and responsivity of detectors in the system. For example, the light source 210 may include at least one laser with an operating wavelength between about 650 nm and 1150 nm. Alternatively, the light source 210 may include a laser diode configured to emit light at a wavelength between about 800 nm and about 1000 nm, between about 850 nm and about 950 nm, or between about 1300 nm and about 1600 nm. In certain other embodiments, the light source 210 could include a light emitting diode (LED).

The light source 210 of the LIDAR system 200 is generally an eye-safe laser, or put another way, the LIDAR system 200 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

To perform Time of Flight (ToF) LIDAR measurements, the light source 210 is generally a pulsed source configured to produce, emit, or radiate pulses of light with a certain pulse duration. For example, in some non-limiting embodiments of the present technology, the light source 210 may be configured to emit pulses with a pulse duration (e.g., pulse width) ranging from 10 ps to 100 ns. In other non-limiting embodiments of the present technology, the light source 210 may be configured to emit pulses at a pulse repetition frequency of approximately 100 kHz to 5 MHz or a pulse period (e.g., a time between consecutive pulses) of approximately 200 ns to 10 μs. Overall, however, the light source 210 can generate the output beam 212 with any suitable average optical power, and the output beam 212 may include optical pulses with any suitable pulse energy or peak optical power for a given application.

In some non-limiting embodiments of the present technology, the light source 210 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source 210 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source 210 may include one or more laser diodes that are current modulated to produce optical pulses.

In some non-limiting embodiments of the present technology, the light source 210 is generally configured to emit the output beam 212 that is a collimated optical beam, but it is contemplated that the beam produced could have any suitable beam divergence for a given application. Broadly speaking, divergence of the output beam 212 is an angular measure of an increase in beam cross-section size (e.g., a beam radius or beam diameter) as the output beam 212 travels away from the light source 210 or the LIDAR system 200. In some non-limiting embodiments of the present technology, the output beam 212 may have a substantially circular cross-section. It is also contemplated that the output beam 212 emitted by light source 210 could be unpolarized or randomly polarized, could have no specific or fixed polarization (e.g., the polarization may vary with time), or could have a particular polarization (e.g., the output beam 212 may be linearly polarized, elliptically polarized, or circularly polarized).

In at least some non-limiting embodiments of the present technology, the output beam 212 and the input beam 214 may be substantially coaxial. In other words, the output beam 212 and input beam 214 may at least partially overlap or share a common propagation axis, so that the input beam 214 and the output beam 212 travel along substantially the same optical path (albeit in opposite directions). Nevertheless, in other non-limiting embodiments of the present technology, the output beam 214 and the input beam 214 may not be coaxial, or in other words, may not overlap or share a common propagation axis inside the LIDAR system 200, without departing from the scope of the present technology. In the schematic illustration of FIG. 3, the beams 212, 214 are illustrated spaced from one another simply for ease of reference.

With continued reference to FIG. 3, there is further provided the beam splitting element 220 disposed in the housing 205. For example, as previously mentioned, the beam splitting element 220 is configured to direct the output beam 212 from the light source 210 towards the scanning system 230. The beam splitting element 220 is also arranged and configured to direct the input beam 314 reflected from the surroundings to the sensor array 250 for further processing thereof by the controller 310. It should be noted that some portion (for example, up to 10%) of the intensity of the output beam 212 may be absorbed by a material of the beam splitting element 220, which depends on a particular configuration thereof.

Depending on the particular embodiment of the LIDAR system 200, the beam splitting element 220 could be provided in a variety of forms, including but not limited to: a glass prism-based beam splitter component, a half-silver mirror-based beam splitter component, a dichroic mirror prism-based beam splitter component, a fiber-optic-based beam splitter component, and the like. Thus, according to non-limiting embodiments of the present technology, a non-exhaustive list of adjustable parameters associated with the beam splitting element 220, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like. In a specific non-limiting example, the beam splitting element 220 could be implemented as a fiber-optic-based beam splitter component that may be of a type available from OZ Optics Ltd. of 219 Westbrook Rd Ottawa, Ontario K0A 1L0 Canada. It should be expressly understood that the beam splitting element 304 can be implemented in any other suitable equipment.

It should be noted that, in various non-limiting embodiments of the present technology, the LIDAR system 200 could include additional optical components. For example, the LIDAR system 200 may include one or more optical components configured to condition, shape, filter, modify, steer, or direct the output beam 212 and/or the input beam 214. For example, the LIDAR system 200 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

Generally speaking, the scanning system 230 steers the output beam 212 in one or more directions downrange towards the surroundings 150 and conversely steers the input beam 214 upon arrival at the LIDAR system 200 to the sensory array 250. The scanning system 230 is communicatively coupled to the controller 280. As such, the controller 280 is configured to control the scanning system 230 so as to guide the output beam 212 in a desired direction downrange and/or along a predetermined scan pattern. Broadly speaking, in the context of the present specification "scan pattern" may refer to a pattern or path along which the output beam 212 is directed by the scanning system 230 during operation.

According to the present embodiments, the scanning system 230 includes a scanning mirror 232 for oscillating about a first axis 233. In the present embodiment, the scanning mirror 232 is a galvonometer-based scanning mirror, also referred to as a galvo mirror 232. It is contemplated that details of the scanning mirror 232 could vary in different embodiments. In the present embodiment, the first axis 233 is oriented generally horizontally (as is illustrated in the schematic top view of FIG. 3) such that light reflected therefrom is scanned vertically up or down as the scanning mirror 232 oscillates.

As the scanning mirror 232 oscillates about the axis 233, the mirror 232 rotates in two directions. Specifically, the scanning mirror 232 rotates in a first rotational direction 241 about the axis 233 and in a second rotational direction 243 about the axis 233, the second rotational direction 243 being the direction directly opposite the first rotational direction 241 (see FIGS. 4 and 5). When the scanning mirror 232 is moving in the first rotational direction 241, the output beam 212 from the light source 210 is reflected therefrom and scanned generally vertically downward over the surroundings 150. When the scanning mirror 232 has reached the end of the scanning region, the scanning mirror 232 is returned to a scan starting position by moving in the second rotational direction 243, where the reflecting face of the scanning mirror 232 is rotated upward. While the scanning mirror 232 is rotating in the second rotational direction 243 to return to be scan starting position, no output beam is produced by the light source 210 (as no LIDAR data points are being collected).

As noted above, the scanning mirror 232 rotates in the first rotational direction 241 to scan the surroundings 150 and in the second rotational direction 243 to return the scanning mirror 232 to a start position. As no LIDAR measurements are being taken when the scanning mirror 232 is rotating in the second rotational direction 243, it is preferable the return the scanning mirror 232 to the scan start position quickly, and for the scanning mirror 232 to be scanning (rotating in the first rotational direction 241) for at least a majority of operating time of the LIDAR system 200. In the present embodiment, the scanning mirror 232 is thus configured to rotate at the first rate, in the first rotational directions 241, for at least 90% of operation time of the system 200 and to rotate at the second rate, in the second rotational direction 243, for no more than 10% of operation time of the system 200. In order to accomplish this balance of time between the scanning mode (in the first rotational direction 241) and the return to start mode (in the second rotation direction 243), the second rate of rotation of the scanning mirror 232 is greater than the first rate of rotation of the scanning mirror 232. In the present embodiment, the second rate of rotation is approximately ten times faster than the first rate of rotation. It is contemplated that in some embodiments the relative time of operation spent in each mode, and thus the relative difference between the first and second rates of rotation, could vary in different non-limiting embodiments.

The scanning system 230 also includes a scanning element 236 arranged and configured to receive the output beam 212 from the scanning mirror 232 and to scan the output beam 212 over the surroundings 150. The scanning element 236 in the present embodiments is specifically a rotating (spinning) prism 236, although specifics of the scanning element 236 could vary in different embodiments. The prism 236 rotates about a second axis 237, perpendicular to the first axis 233, specifically a generally vertical axis 237 in the present embodiment. As the prism 236 rotates about the axis 237, the output beam 212 is scanning generally horizontally across the surroundings 150. In combination with the vertical scanning of the scanning mirror 232, the output beam 212 is thus scanned over a two-dimensional area of the surroundings. In the present embodiment, the rotating prism 236 is configured to rotate about the axis 237 at a rate of approximately ten times faster than the first rotational rate (in the first direction 241) of the scanning mirror 232, but the relative rates between the prism 236 and the mirror 232 could vary in different embodiments.

In certain non-limiting embodiments of the present technology, the scanning system 230 could further include a variety of other optical components and/or mechanical-type components for performing the scanning of the output beam 212. For example, the scanning system 230 could, in some embodiments, include one or more mirrors, prisms, lenses, MEM components, piezoelectric components, optical fibers, splitters, diffractive elements, collimating elements, and the like. It should be noted that the scanning system 230 may also include one or more additional actuators (not separately depicted) driving at least some of the other optical components to rotate, tilt, pivot, or move in an angular manner about one or more axes, for example.

According to certain non-limiting embodiments of the present technology, the sensor array 250 is communicatively coupled to the controller 310 and may be implemented in a variety of ways. According to the present technology, the sensor array 250 includes a plurality of detectors 252 (see FIGS. 4 and 5). In the illustrated example, the sensor array 250 is a linear array of sixteen detectors 252 arranged in a plane, but the particular arrangement and total number of detectors 252 could vary. It is also noted that the array 250 is illustrated schematically as extending vertically, but arrangements such as horizontal, diagonal, irregular spacing, and/or two-dimensional grids of detectors 252 are also contemplated. The different arrangements could be chosen based on a number of factors, including but not limited to: detector type, configuration details of the scanning system 230, image reconstruction method details, and desired image resolution. As will be described in more detail below, a particular detector 255 of the detectors 252 is utilized for LIDAR measurements, while the remaining detectors 252 are utilized in an image capture mode (described further below).

In the present example, each detector 252 is a photodetector, but could include (but is not limited to) a photoreceiver, optical receiver, optical sensor, detector, optical detector, optical fibers, and the like. As mentioned above, in some non-limiting embodiments of the present technology, the sensor array 250 may be configured to acquire or detects at least a portion of the input beam 214 and produce an electrical signal that corresponds to the input beam 214. For example, if the input beam 214 includes an optical pulse, one or more of the detectors 252 of the sensor array 250 may produce an electrical current or voltage pulse that corresponds to the optical pulse detected by the sensor array 250. It is contemplated that, in various non-limiting embodiments of the present technology, the detectors 252 could be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the sensor array 250 and/or the controller 280 may also include circuitry or software that performs signal amplification, sampling, filtering, signal conditioning, analog-to-digital conversion, time-to-digital conversion, pulse detection, threshold detection, rising-edge detection, falling-edge detection, and the like. For example, the sensor array 250 may include electronic components configured to convert a received photocurrent (e.g., a current produced by an APD in response to a received optical signal) into a voltage signal. The sensor array 250 may also include additional circuitry for producing an analog or digital output signal that corresponds to one or more characteristics (e.g., rising edge, falling edge, amplitude, duration, and the like) of a received optical pulse.

Depending on the implementation, the controller 280 may include one or more processors, an application-specific integrated circuit (ASIC), a field-programmable gate array (FPGA), and/or other suitable circuitry. The controller 280 may also include non-transitory computer-readable memory to store instructions executable by the controller 280 as well as data which the controller 280 may produce based on the signals acquired from other internal components of the LIDAR system 200 and/or may provide signals to the other internal components of the LIDAR system 200. The memory can include volatile (e.g., RAM) and/or non-volatile (e.g., flash memory, a hard disk) components. The controller 280 may be configured to generate data during operation and store it in the memory. For example, this data generated by the controller 280 may be indicative of the data points in the distance-information point cloud of the LIDAR system 200.

It is contemplated that, in at least some non-limiting embodiments of the present technology, the controller 280 could be implemented in a manner similar to that of implementing the electronic device 210, without departing from the scope of the present technology. In addition to collecting data from the sensor array 250, the controller 280 could also be configured to provide control signals to, and potentially receive diagnostics data from, the light source 210 and the scanning system 230.

As previously stated, the controller 280 is communicatively coupled to the light source 210, the scanning system 230, and the sensor array 250. In some non-limiting embodiments of the present technology, the controller 280 may be configured to receive electrical trigger pulses from the light source 210, where each electrical trigger pulse corresponds to the emission of an optical pulse by the light source 210. The controller 280 may further provide instructions, a control signal, and/or a trigger signal to the light source 210 indicating when the light source 210 is to produce optical pulses indicative, for example, of the output beam 212. It is also contemplated that the controller 280 may cause the light source 210 to adjust one or more characteristics of output beam 212 produced by the light source 210 such as, but not limited to: frequency, period, duration, pulse energy, peak power, average power, and wavelength of the optical pulses.

By the present technology, the controller 280 is configured to determine a "time-of-flight" value for an optical pulse in order to determine the distance between the LIDAR system 200 and one or more objects in the field of view, as will be described further below. The time of flight is based on timing information associated with (i) a first moment in time when a given optical pulse (for example, of the output beam 212) was emitted by the light source 210, and (ii) a second moment in time when a portion of the given optical pulse (for example, from the input beam 214) was detected or received by the sensor array 250, specifically when the input beam 214 is detected by a particular detector 255 of the detectors 252 of the sensor array 250. In some non-limiting embodiments of the present technology, the first moment may be indicative of a moment in time when the controller 280 emits a respective electrical pulse associated with the given optical pulse; and the second moment in time may be indicative of a moment in time when the controller 280 receives, from the sensor array 250, an electrical signal generated in response to receiving the portion of the given optical pulse from the input beam 214.

By the present technology, the controller 280 is configured to determine, based on the first moment in time and the second moment in time, a time-of-flight (ToF) value and/or a phase modulation value for the emitted pulse of the output beam 212. The time-of-light value T, in a sense, a "round-trip" time for the emitted pulse to travel from the LIDAR system 200 to an object and back to the LIDAR system 200. The controller 280 is thus broadly configured to determine a distance to an object in accordance with the following equation:

$$D = \frac{c \cdot T}{2}, \tag{1}$$

wherein D is the distance to be determined, T is the time-of-flight value, and c is the speed of light (approximately $3.0\times10^8$ m/s).

The LIDAR system 200 is thus configured to determine distances to one or more other potential objects located in the surroundings 150. By scanning the output beam 212 across the region of interest of the LIDAR system 200 in accordance with a predetermined scan pattern (generally over a two-dimensional area of the surroundings 150 as mentioned above), the controller 280 is configured to map distances to respective data points within the region of interest of the LIDAR system 200. As a result, the controller 280 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 110 for detecting, or otherwise identifying, objects or determining a shape or distance of potential objects within the region of interest of the LIDAR system 200. It is contemplated that the LIDAR system 200 may be configured to repeatedly/iteratively capture and/or generate point clouds at any suitable rate for a given application.

According to embodiments of the present technology, the LIDAR system 200 is further configured and arranged to operate in an image capture mode, in addition to a LIDAR measurement mode. The LIDAR measurement mode refers broadly to the emission and collection of light to determine the distance-information point cloud, described above, while the scanning mirror 232 is moving in the first rotation direction 241, at the first rate of rotation. According to the present technology, the system 200 is further configured to acquire images of the surroundings 150, referred to as the image capture mode, when the scanning mirror 232 is moving in the second rotation direction 243, at the second rate of rotation.

Figure 4:
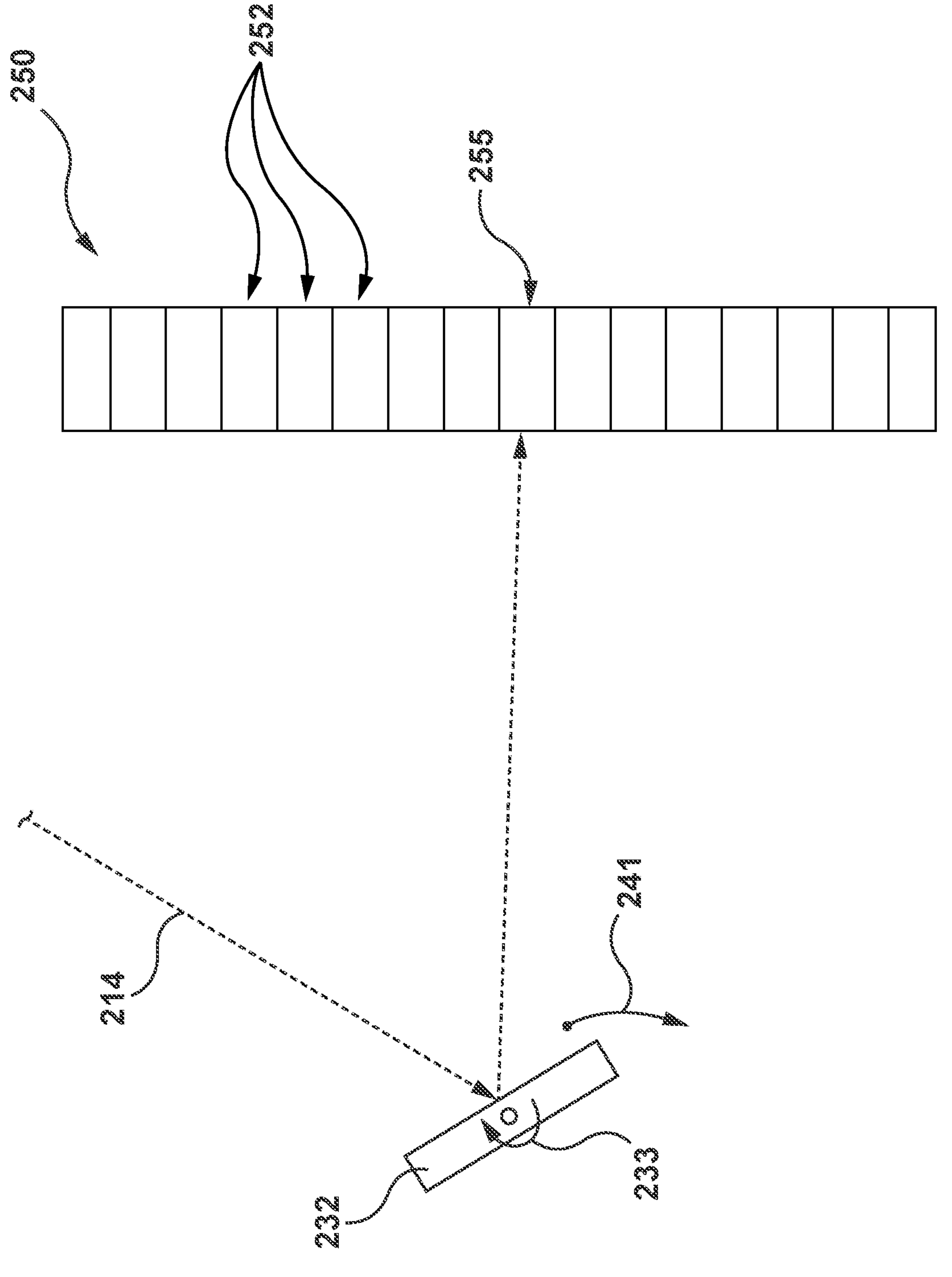
FIG. 4 schematically depicts a sensor array of the LIDAR system of FIG. 3 in a first operation mode.
Figure 5:
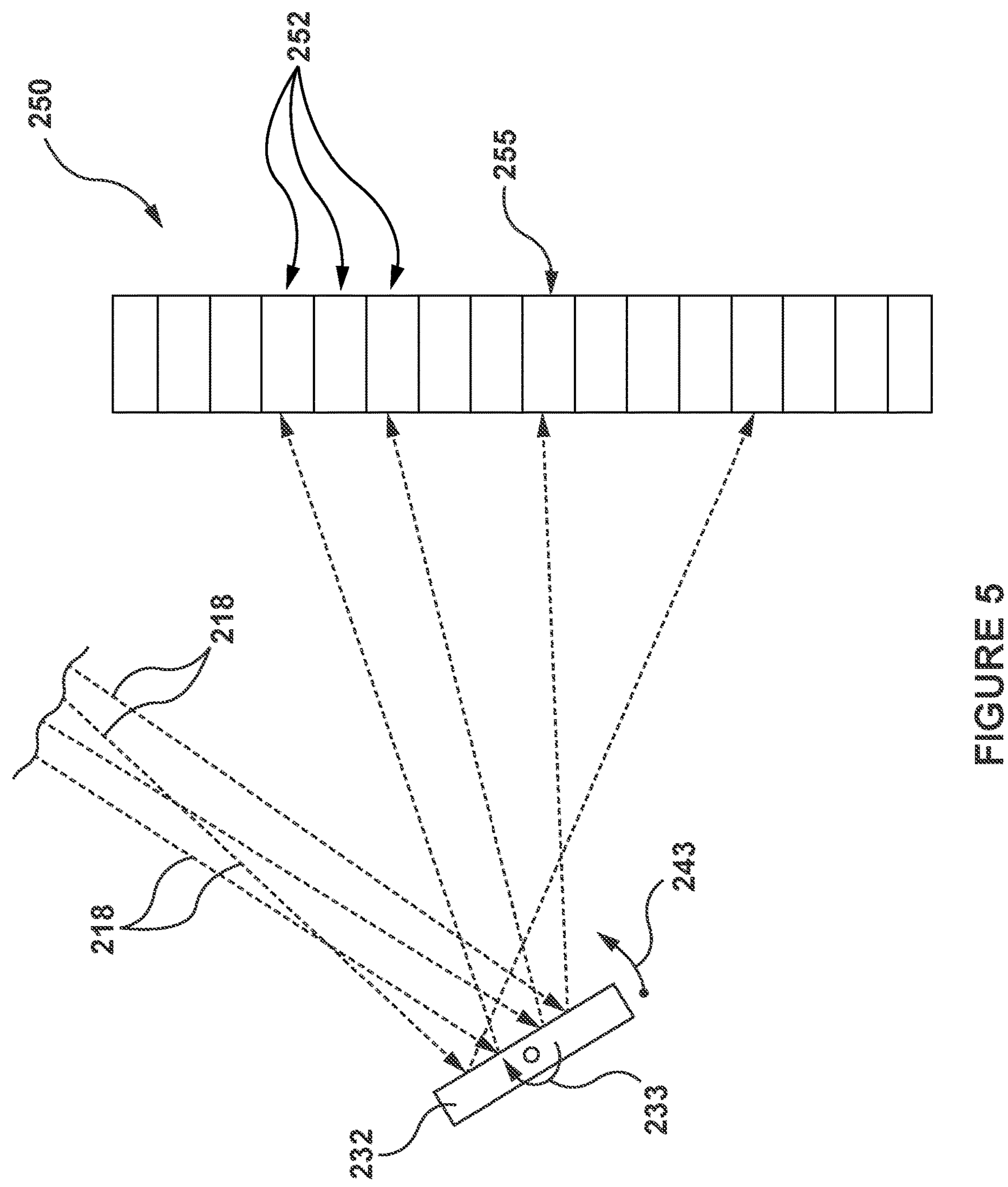
FIG. 5 schematically depicts the sensor array of FIG. 4 in a second operation mode.

To perform these modes, the sensor array 250 and the controller 280 are configured to determine a distance-information point cloud based on light collected by the sensor array 250 while the scanning mirror 232 is rotating at the first rate in the first rotation direction 241 (see FIG. 4). Specifically, the scanning system 230 is arranged to direct the input beam 214 to the selected detector 255 of the sensor array 250, from which the controller 280 determines time of flight information to create the distance-information point cloud, as described above. In the image capture mode, illustrated in FIG. 5, the sensor array 250 and the controller 280 are configured to determine an image of the scanned area (the surroundings 150) based on light collected by the sensor array 250 while the scanning mirror 232 is rotating at the second rate in the second rotation direction 243. Specifically, signals from different light rays entering the scanning system 230 and impinging any one of the detectors 252 is collected by the controller 280, while the scanning mirror 232 is returning to the scan starting position. As is illustrated, light coming from different areas of a field of view of the system 200 is directed by the scanning system 230, to different detectors 252 of the sensor array 250. As the light source 210 is not emitting light while the scanning mirror 232 is moving in the second rotational direction 243, light rays entering the system 200 and being collected to form images originates in ambient light in the surroundings 150. In at least some embodiments, the detectors 232 of the sensor array 250 could have a limited acceptance wavelength band. While light arriving at the sensor array 250 during the image capture mode may have a wide variation in wavelength, it is noted that only light within the acceptance wavelength band will be collected to form images.

The controller 280 is further configured, with an image reconstruction method, to produce an image of at least portions of the surroundings 150. The particular image reconstruction method used will depend on various factors of the system 200 and will thus not be further described herein. As the light recovered from the surroundings 150 is collected while no distance point-cloud measurements are being taken, images of the surroundings can be collected without adding downtime to the LIDAR system 200, nor are any additional optical path or separate sensor arrangements required (beyond the inclusion of the plurality of detectors 252 at the detection plane).

Figure 6:
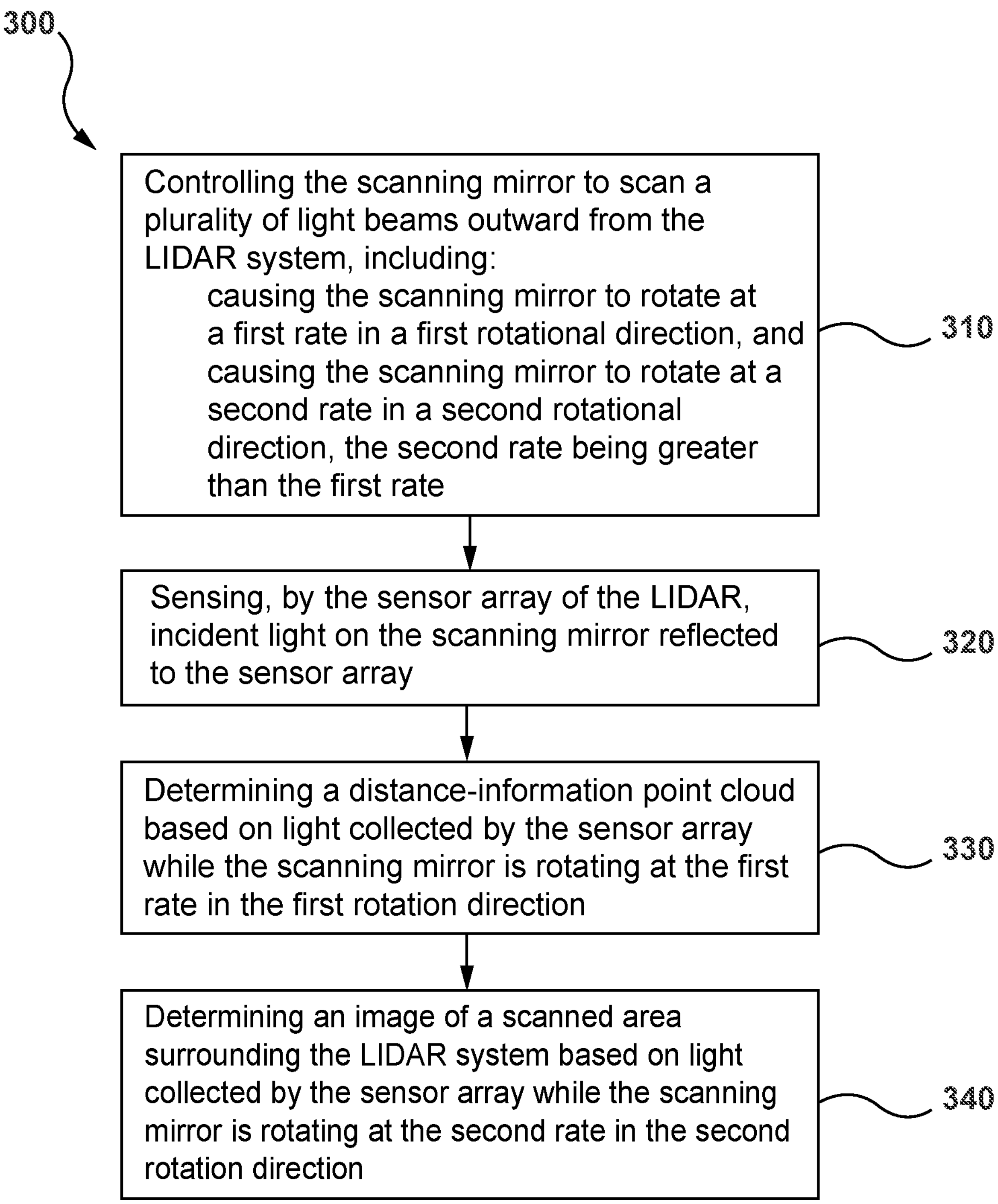
FIG. 6 is a flowchart depicting a method of operation of the LIDAR system of FIG. 3.

As such, the controller 280 is configured to execute a method 300 for operating a LIDAR system, such as the LIDAR system 200, in a manner which can generate the distance-information point cloud and images. With reference now to FIG. 6, there is depicted a flowchart of the method 300, according to the non-limiting embodiments of the present technology. The method 300 may be executed by the controller 280.

Step 310: Controlling the Scanning Mirror to Scan a Plurality of Light Beams Outward from the Lidar System The method 300 begins, at step 310, with controlling the scanning mirror 232 to scan a plurality of light beams outward from the LIDAR system 200, for instance repetitions of the output beam 212. The controlling the scanning mirror 232 includes causing the scanning mirror 232 to rotate at the first rate in the first rotational direction 241. The controlling the scanning mirror 232 also includes causing the scanning mirror 232 to rotate at the second rate in the second rotational direction 243. As is mentioned briefly above, the second rate of rotation is greater than the first rate and the second rotational direction is opposite the first rotational direction.

In at least some embodiments, causing the scanning mirror 232 to rotate at the second rate includes causing the scanning mirror 232 to rotate at a rate at least twice the first rate. In order to minimize the amount of time that the system 200 is not determining the distance-information point cloud, the scanning mirror 232 rotates more quickly back to the starting position than while performing the scan. In the present non-limiting embodiment causing the scanning mirror 232 to rotate at the second rate specifically includes causing the scanning mirror 232 to rotate at a rate at approximately ten times the first rate. In at least some embodiments, controlling the scanning mirror 232 to scan includes causing the scanning mirror 232 to rotate at the first rate for at least 90% of operation time, and causing the scanning mirror 232 to rotate at the second rate for no more than 10% of operation time.

In at least some embodiments, the method 300 further includes controlling the scanning element 236 (the prism 236) to rotate about the second axis 237 which is perpendicular to the first axis 233. In some cases, controlling the prism 236 to rotate includes controlling the prism 236 to rotate about a rotation rate of approximately ten times faster than the first (scanning) rate of the scanning mirror 232.

Step 320: Sensing, by a Sensor Array, Incident Light on the Scanning Mirror Reflected to the Sensor Array The method 300 continues, at step 320, with sensing, by the sensor array 250, incident light on the scanning mirror 232 reflected to the sensor array 250. While the scanning mirror 232 is rotating in the first rotational direction 241, the input beam 214 is sensed by the selected detector of the sensor array 250 in order to form the distance-information point cloud array. While the scanning mirror 232 is rotating in the second rotational direction 243, light reflected from the surroundings 150 is sensed by one or more of the detectors 252 of the sensor array 250 in order to construct images of portions of the surroundings 150.

Step 330: Determining a Distance-Information Point Cloud Based on Light Collected by the Sensor Array while the Scanning Mirror is Rotating at the First Rate in the First Rotation Direction The method 300 continues, at step 320, with determining a distance-information point cloud based on light collected by the sensor array 250 while the scanning mirror 232 is rotating at the first rate in the first rotation direction 241.

In certain embodiments, determining the distance-information point cloud based on light collected by the sensor array 250 includes determining the distance-information point cloud based on light collected by the selected sensor 255 of the sensor array 250.

Step 340: Determining an Image of a Scanned Area Surrounding the Lidar System Based on Light Collected by the Sensor Array while the Scanning Mirror is Rotating at the Second Rate in the Second Rotation Direction The method 300 continues, at step 320, with determining an image of a scanned area surrounding the LIDAR system 200 based on light collected by the sensor array 250 while the scanning mirror 232 is rotating at the second rate in the second rotation direction 243. It is noted that the scanned area could include a same or different field of view as the distance-information point cloud.

In some embodiments, determining one or more images of the surroundings 150 includes retrieving light information from each detector 252 forming the sensor array 250. The method 300 then further includes constructing, by the controller 180, the image(s) based on an image reconstruction method based on at least the light information retrieved.

The method 300 hence terminates.

In at least some non-limiting embodiments, the method 300 further includes controlling the light source 210 to create the plurality of light beams only while the scanning mirror 232 is caused to rotate at the first rate in the first rotation direction 241.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for managing scanning by a LIDAR system, the method being performed by a controller of the LIDAR system, the method comprising:

controlling a light source of the LIDAR system to create a plurality of light beams;

controlling a scanning mirror of the LIDAR system to scan the plurality of light beams outward from the LIDAR system, controlling the scanning mirror to scan including causing the scanning mirror to rotate at a first rate in a first rotational direction;

sensing, while the scanning mirror is rotating in the first rotational direction, by a sensor array of the LIDAR system, incident light on the scanning mirror reflected to the sensor array;

determining a distance-information point cloud based on light collected by the sensor array while the scanning mirror is rotating at the first rate in the first rotational direction;

controlling the scanning mirror, subsequent to sensing the incident light while the scanning mirror is rotating in the first rotational direction, the controlling including causing the scanning mirror to rotate at a second rate in a second rotational direction, the second rate being greater than the first rate, the second rotational direction being opposite the first rotational direction;

controlling the light source to stop producing light beams while the scanning mirror is rotating in the second rotational direction;

sensing, by the sensor array, while the scanning mirror is rotating in the second rotational direction, incident light on the scanning mirror reflected to the sensor array; and determining an image of a scanned area surrounding the LIDAR system based on light collected by the sensor array while the scanning mirror is rotating at the second rate in the second rotational direction.

2. The method of claim 1, wherein determining the distance-information point cloud based on light collected by the sensor array comprises determining the distance-information point cloud based on light collected by a selected sensor of the sensor array.

3. The method of claim 1, wherein causing the scanning mirror to rotate at the second rate includes causing the scanning mirror to rotate at a rate at least twice the first rate.

4. The method of claim 1, wherein causing the scanning mirror to rotate at the second rate includes causing the scanning mirror to rotate at a rate at approximately ten times the first rate.

5. The method of claim 1, wherein determining the image of the scanned area includes:

retrieving light information from each of a plurality of detectors forming the sensor array; and constructing the image based on an image reconstruction method based on at least the light information retrieved.

6. The method of claim 1, wherein controlling the scanning mirror to scan includes:

causing the scanning mirror to rotate at the first rate for at least 90% of operation time, and causing the scanning mirror to rotate at the second rate for no more than 10% of operation time.

7. The method of claim 1, wherein:

the scanning mirror rotates about a first axis; and further comprising:

controlling a scanning element to rotate about a second axis, the second axis being perpendicular to the first axis.

8. The method of claim 7, wherein controlling the scanning element comprises controlling the scanning element to rotate about a rotation rate of approximately ten times faster than the first rate of the scanning mirror.

9. A LIDAR system, comprising:

a controller;

a light source operatively connected to the controller;

a sensor array operatively connected to the controller, the sensor array comprising a plurality of detectors; and a scanning system operatively connected to the controller, the scanning system comprising:

a scanning mirror configured to oscillate about a first axis, and a scanning element configured to rotate about a second axis, the second axis being perpendicular to the first axis, the controller being configured to control the light source to create a plurality of light beams;

control the scanning mirror to scan the plurality of light beams outward from the LIDAR system, controlling the scanning mirror including causing the scanning mirror to rotate at a first rate in a first rotational direction;

sense, while the scanning mirror is rotating in the first rotational direction, by the sensor array, incident light on the scanning mirror reflected to the sensor array;

determine a distance-information point cloud based on light collected by the sensor array, while the scanning mirror is rotating at the first rate in the first rotational direction;

control the scanning mirror, subsequent to sensing the incident light while the scanning mirror is rotating in the first rotational direction, the controlling including causing the scanning mirror to rotate at a second rate in a second rotational direction, the second rate being greater than the first rate, the second rotational direction being opposite the first rotational direction;

control the light source to stop producing light beams while the scanning mirror is rotating in the second rotational direction;

sense, by the sensor array, while the scanning mirror is rotating in the second rotational direction, incident light on the scanning mirror reflected to the sensor array; and determine an image of a scanned area surrounding the LIDAR system based on light collected by the sensor array while the scanning mirror is rotating at the second rate in the second rotational direction.

10. The LIDAR system of claim 9, wherein the second rate of rotation of the scanning mirror is greater than the first rate of rotation of the scanning mirror.

11. The LIDAR system of claim 10, wherein the second rate of rotation is approximately ten times faster than the first rate of rotation.

12. The LIDAR system of claim 9, wherein the LIDAR system is arranged and configured to determine the distance-information point cloud based on time of flight (ToF) determined using at least one of the plurality of detectors.

13. The LIDAR system of claim 9, wherein the plurality of detectors comprises at least sixteen detectors arranged in a plane.

14. The LIDAR system of claim 9, wherein the scanning element is a rotating prism spinning about the second axis.

15. The LIDAR system of claim 14, wherein the rotating prism is configured to rotate about the second axis at a rate of approximately ten times faster than the first rate of the scanning mirror.

16. The LIDAR system of claim 9, wherein the scanning mirror is configured:

to rotate at the first rate for at least 90% of operation time of the LIDAR system; and to rotate at the second rate for no more than 10% of operation time of the LIDAR system.

* * * * *